United States Patent
Rabinovich et al.

(10) Patent No.: US 11,371,349 B2
(45) Date of Patent: Jun. 28, 2022

(54) GAS IMPINGEMENT IN-PROCESS COOLING SYSTEM

(71) Applicant: United Technologies Corporation, Farmington, CT (US)

(72) Inventors: Albert Rabinovich, West Hartford, CT (US); William M. Rose, Conway, SC (US); William J. Brindley, Hebron, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 658 days.

(21) Appl. No.: 16/376,101

(22) Filed: Apr. 5, 2019

(65) Prior Publication Data
US 2020/0318482 A1    Oct. 8, 2020

(51) Int. Cl.
*F01D 5/00*     (2006.01)
*B23K 26/342*   (2014.01)
(Continued)

(52) U.S. Cl.
CPC ............ *F01D 5/005* (2013.01); *B23K 26/342* (2015.10); *B23K 26/32* (2013.01);
(Continued)

(58) Field of Classification Search
CPC ......... F01D 5/005; B23K 26/32; B23K 26/34; B23K 26/342; B23K 26/14;
(Continued)

(56) References Cited

U.S. PATENT DOCUMENTS

| 5,554,837 A | 9/1996 | Goodwater et al. |
| 6,020,571 A | 2/2000 | Grossklaus |

(Continued)

FOREIGN PATENT DOCUMENTS

| CN | 104694921 B | 8/2017 |
| CN | 206956150 U | 2/2018 |

(Continued)

OTHER PUBLICATIONS

European Search Report Application No. EP20166591; dated Aug. 10, 2020; pp. 8.

(Continued)

*Primary Examiner* — Moshe Wilensky
(74) *Attorney, Agent, or Firm* — Cantor Colburn LLP

(57) ABSTRACT

A blade repair apparatus is provided and includes a deposition head which is movable relative to base materials and configured to execute a repair operation that includes a deposition of additional materials onto the base materials during deposition head movements, a temperature control system including a temperature regulating assembly coupled with the deposition head in a trailing position and a controller. The controller is operably coupled to the deposition head and the temperature control system. The controller is configured to control the deposition head movements and depositional operations of the deposition head. The controller is configured to control the temperature control system such that the temperature regulating assembly controls temperatures of at least the base materials and the additional materials during at least the deposition head movements and the depositional operations.

12 Claims, 8 Drawing Sheets

(51) Int. Cl.
*B23K 101/00* (2006.01)
*B23K 26/32* (2014.01)
*B23P 6/00* (2006.01)

(52) U.S. Cl.
CPC ......... *B23K 2101/001* (2018.08); *B23P 6/007* (2013.01); *F05D 2220/323* (2013.01); *F05D 2230/234* (2013.01); *F05D 2230/31* (2013.01); *F05D 2230/80* (2013.01)

(58) Field of Classification Search
CPC . B23K 2101/001; B23K 37/003; B23P 6/007; F05D 2220/323; F05D 2230/234; F05D 2230/31; F05D 2230/80; F05D 2270/303
See application file for complete search history.

(56) References Cited

U.S. PATENT DOCUMENTS

| | | | |
|---|---|---|---|
| 6,054,672 | A | 4/2000 | Foster et al. |
| 7,875,135 | B2 | 1/2011 | Kelly et al. |
| 8,584,357 | B2 | 11/2013 | Richter et al. |
| 2008/0173624 | A1 | 7/2008 | Dreschsler |
| 2011/0248001 | A1 | 10/2011 | Kawanaka et al. |
| 2013/0104397 | A1 | 5/2013 | Bunker |
| 2014/0259589 | A1 | 9/2014 | Xu |
| 2016/0340762 | A1 | 11/2016 | Cavanaugh et al. |
| 2017/0032668 | A1 | 2/2017 | Al-Deek et al. |
| 2017/0326681 | A1* | 11/2017 | Sidhu ................. B24C 1/10 |
| 2018/0373231 | A1 | 12/2018 | Worthing, Jr. |
| 2019/0001437 | A1 | 1/2019 | Mathisen |
| 2019/0022803 | A1 | 1/2019 | Srinivasan et al. |
| 2020/0318482 | A1 | 10/2020 | Rabinovich et al. |

FOREIGN PATENT DOCUMENTS

| | | |
|---|---|---|
| CN | 105671546 B | 6/2018 |
| EP | 1637274 A1 | 3/2006 |

OTHER PUBLICATIONS

Non-Final Office Action cited in U.S. Appl. No. 16/376,155 dated Nov. 24, 2020, pp. 23.

Euroepan Search Report Application No. EP20166585; dated Sep. 14, 2020; pp. 6.

* cited by examiner

GAS IMPINGEMENT IN-PROCESS COOLING SYSTEM

BACKGROUND

Exemplary embodiments of the present disclosure relate generally to airfoils and, in one embodiment, to a gas impingement in-process cooling system for use with airfoils of combustors that are subject to laser cladding and other similar processes.

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors and the turbine section includes low and high pressure turbines.

Within the compressor section, high energy fluids aerodynamically interact with blades and vanes such that air flowing into the gas turbine engine can be compressed. Likewise, within the turbine section, high energy fluids, such as the products of combustion, aerodynamically interact with blades and vanes in order to expand and to thereby drive compressor and rotor rotation.

For both compressor and turbine sections, the blades that interact with the high energy fluids rotate about an engine centerline and are shaped like airfoils with tips that extend outwardly. As the blades rotate, the tips trace along paths defined just inside of outer walls. At these locations, the tips can be exposed to high temperature and high pressure conditions that lead to wear and damage of the blades that often needs to be repaired. The repairs can involve the building up of refined microstructures at blade tips in order to achieve required life spans.

In order to prevent grain growth in the refined microstructures during laser cladding and other similar processes of the repairs, it is typically helpful to obtain relatively high cooling rates in the local materials. To this end, certain conventional cooling methods have been utilized that are generally concerned with cooling base materials of the parts, but tend not to achieve desired levels of cooling in the materials of the refined microstructures that are laid down on the base materials.

Meanwhile, when rotor blades need to be repaired, weld fillers are typically used. Current weld filler techniques result in welds that are not durable, however, and can lead to early engine removal issues.

BRIEF DESCRIPTION

According to an aspect of the invention, a blade repair apparatus is provided and includes a deposition head which is movable relative to base materials and configured to execute a repair operation that includes a deposition of additional materials onto the base materials during deposition head movements, a temperature control system including a temperature regulating assembly coupled with the deposition head in a trailing position and a controller. The controller is operably coupled to the deposition head and the temperature control system. The controller is configured to control the deposition head movements and depositional operations of the deposition head. The controller is configured to control the temperature control system such that the temperature regulating assembly controls temperatures of at least the base materials and the additional materials during at least the deposition head movements and the depositional operations.

In accordance with additional or alternative embodiments, the base materials form a rotor blade tip.

In accordance with additional or alternative embodiments, the controller controls the deposition head movements and depositional operations of the deposition head to execute a weld operation along the rotor blade tip and the controller controls the temperature control system such that the temperature regulating assembly preheats the base materials and maintains temperatures of the base materials and the additional materials during at least the deposition head movements and the depositional operations.

In accordance with additional or alternative embodiments, the deposition head includes a laser emitter and a powder dispenser and the temperature regulating assembly includes an induction coil configured to heat at least the base materials and the additional materials.

In accordance with additional or alternative embodiments, the controller controls the deposition head movements and depositional operations of the deposition head to execute a laser cladding process and the controller controls the temperature control system such that the temperature regulating assembly cools at least the base materials and the additional materials during at least the deposition head movements and the depositional operations.

In accordance with additional or alternative embodiments, the deposition head includes a laser emitter and a powder dispenser and the temperature regulating assembly includes impingement diffusers configured to direct impingement gas toward at least the base materials and the additional materials.

According to another aspect of the disclosure, a gas impingement in-process cooling system is provided and includes a deposition head which is movable relative to base materials and configured to execute a repair operation that includes a deposition of additional materials onto the base materials during deposition head movements and a gas impingement assembly including impingement diffusers, a support structure to support the impingement diffusers at opposite sides of the base materials in a trailing position relative to the deposition head and a supply system configured to supply the impingement diffusers with impingement gas.

In accordance with additional or alternative embodiments, the base materials include a rotor blade tip.

In accordance with additional or alternative embodiments, the deposition head is movable along a longitudinal axis of the rotor blade tip.

In accordance with additional or alternative embodiments, the deposition head deposits the additional materials in a laser cladding process.

In accordance with additional or alternative embodiments, the deposition head deposits the additional materials in a column of layers on the rotor blade tip.

In accordance with additional or alternative embodiments, each impingement diffuser includes a perforated tubular body communicative with the supply system.

In accordance with additional or alternative embodiments, each impingement diffuser is configured such that impingement gas supplied thereto is directed toward the base materials and the additional materials in multiple directions.

In accordance with additional or alternative embodiments, the gas impingement assembly includes first impingement diffusers and second impingement diffusers. The support structure supports the first and second impingement diffusers at opposite sides of the base materials in first and second trailing positions relative to the deposition head, respectively, and the supply system supplies the first and second impingement diffusers with the impingement gas.

In accordance with additional or alternative embodiments, a controller is operably coupled to the deposition head and the supply system. The controller is configured to control the deposition head movements and depositional operations of the deposition head. The controller is configured to control the gas impingement assembly such that the supply system supplies the impingement diffusers with the impingement gas during at least the deposition head movements and the depositional operations.

According to another aspect of the disclosure, a method of executing gas impingement in-process cooling is provided and includes operating a deposition head to deposit additional materials onto base materials while moving the deposition head relative to the base materials, arranging impingement diffusers to remain at opposite sides of the base materials in a trailing position relative to the deposition head and supplying the impingement diffusers with impingement gas during deposition head movements and during depositional operations of the deposition head to cool the base materials and the additional materials as the additional materials are deposited.

In accordance with additional or alternative embodiments, the base materials include a rotor blade tip and the operating includes execution of a laser cladding process.

In accordance with additional or alternative embodiments, the operating of the deposition head includes forming a column of layers.

In accordance with additional or alternative embodiments, the method further includes configuring the impingement diffusers to direct the impingement gas supplied thereto toward the base materials and the additional materials in multiple directions.

In accordance with additional or alternative embodiments, the supplying of the impingement diffusers with the impingement gas cools the base materials and the additional materials following solidification of deposited additional materials.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
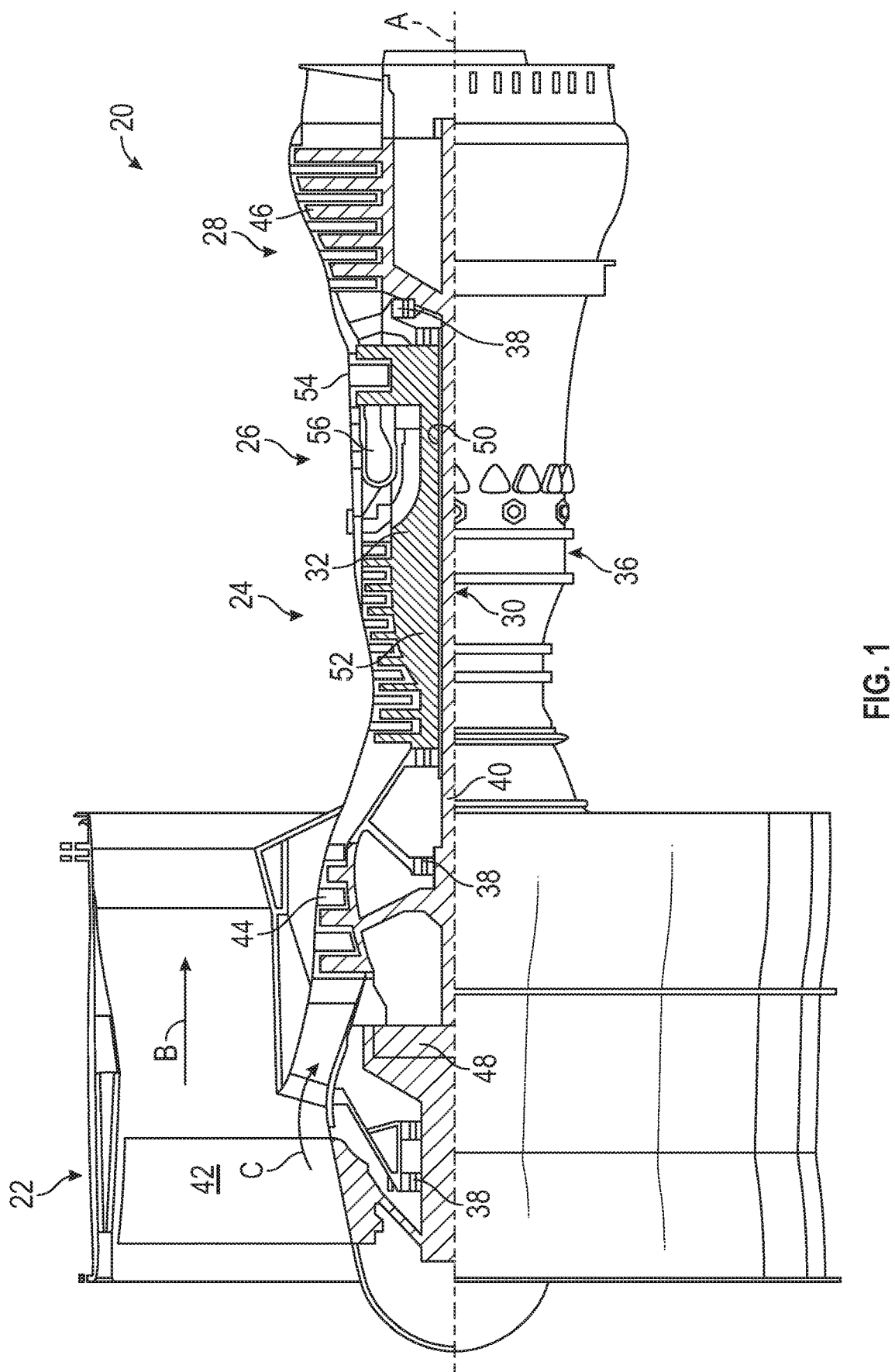
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7° \ R)]^{0.5}$. The "Low corrected fan tip speed" as disclosed herein according to one non-limiting embodiment is less than about 1150 ft/second (350.5 m/sec).

Figure 2:
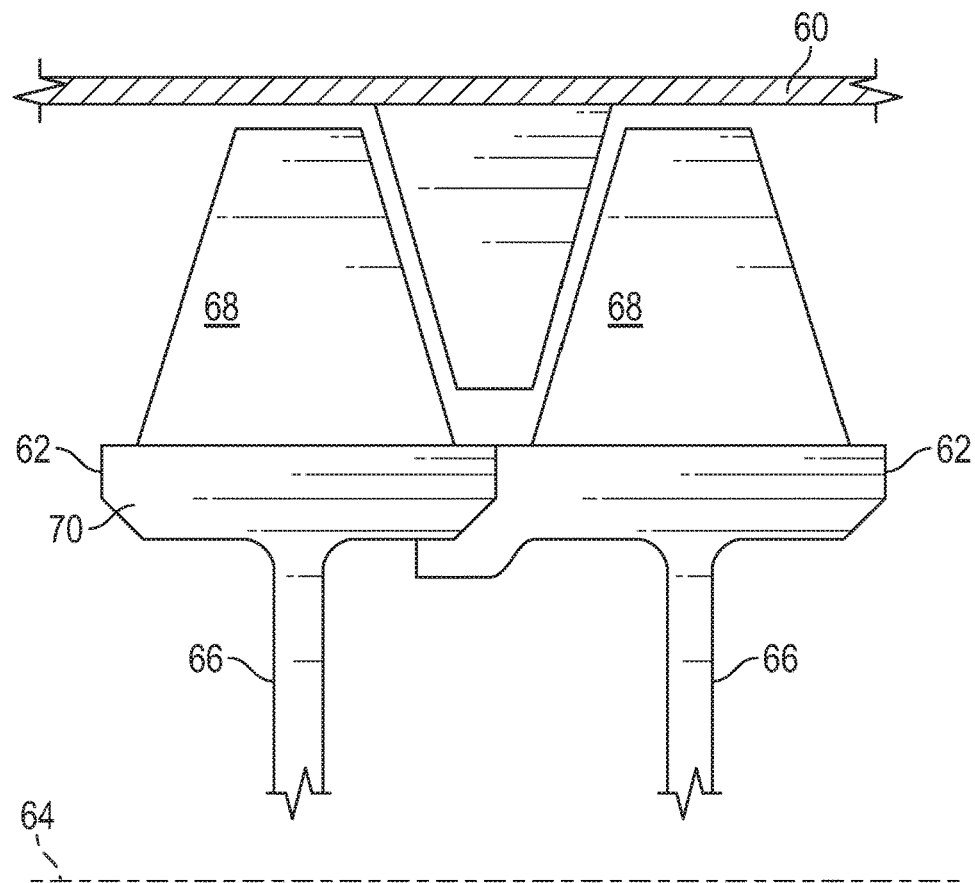
FIG. 2 is a partial cross-sectional view of an embodiment of a portion of a compressor section of the gas turbine engine of FIG. 1.

Referring now to FIG. 2, either or both of the low pressure compressor 44 or the high pressure compressor 52 includes a compressor case 60, in which compressor rotors 62 are arranged along an engine axis 64 about which the compressor rotors 62 rotate. Each compressor rotor 62 includes a rotor disc 66 with a platform 70 and a plurality of rotor blades 68 extending radially outwardly from the platform 70 (i.e., a rotor stack). In some embodiments, the rotor disc 66 and the plurality of rotor blades 68 are a single, unitary structure, an integrally bladed compressor rotor 62. In other embodiments, the rotor blades 68 are each installed to the rotor disc 66 via, for example, a dovetail joint where a tab or protrusion at the rotor blade 68 is inserted into a corresponding slot in the platform 70.

Figure 3:
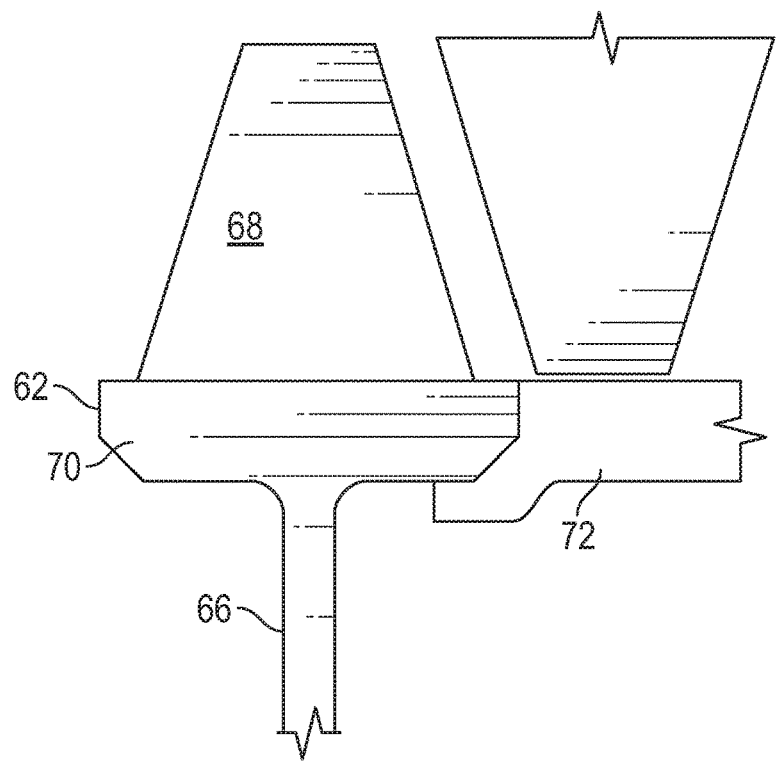
FIG. 3 is a partial cross-sectional view of another embodiment of a portion of a compressor section of the gas turbine engine of FIG. 1.

As shown in FIG. 2, axially adjacent compressor rotors 62 may be joined to each other, while in other embodiments, as shown in FIG. 3, the compressor rotor 62 may be joined to another rotating component, such as a spacer 72. The compressor rotor 62 is secured to the adjacent rotating component by an interference fit or a "snap fit," which in some embodiments is combined with another mechanical fastening, such as a plurality of bolts (not shown) to secure the components and to form or define a snap location.

As will be described below, an advanced cooling method is provided for use in building up refined microstructures at blade tips (for, e.g., rotor blades 68 and other gas turbine engine blades). The advanced cooling method is applicable for base materials and deposited materials as the deposited materials are added during processing. The cooling achieves very high cooling rates as early as possible in the processing and allows for limited grain growth through the use of carefully designed gas impingement systems that maximize cooling efficiencies. In particular, for laser cladding processing, cooling nozzles follow laser cladding sprays and start cooling the deposited material just after solidification. Cooling rates are controlled through cooling system design pressure regulation ahead of a plenum. In addition, a weld repair apparatus and method are provided that will produce relatively high strength welds and allow for increased time-on-wing capabilities.

Figure 4:
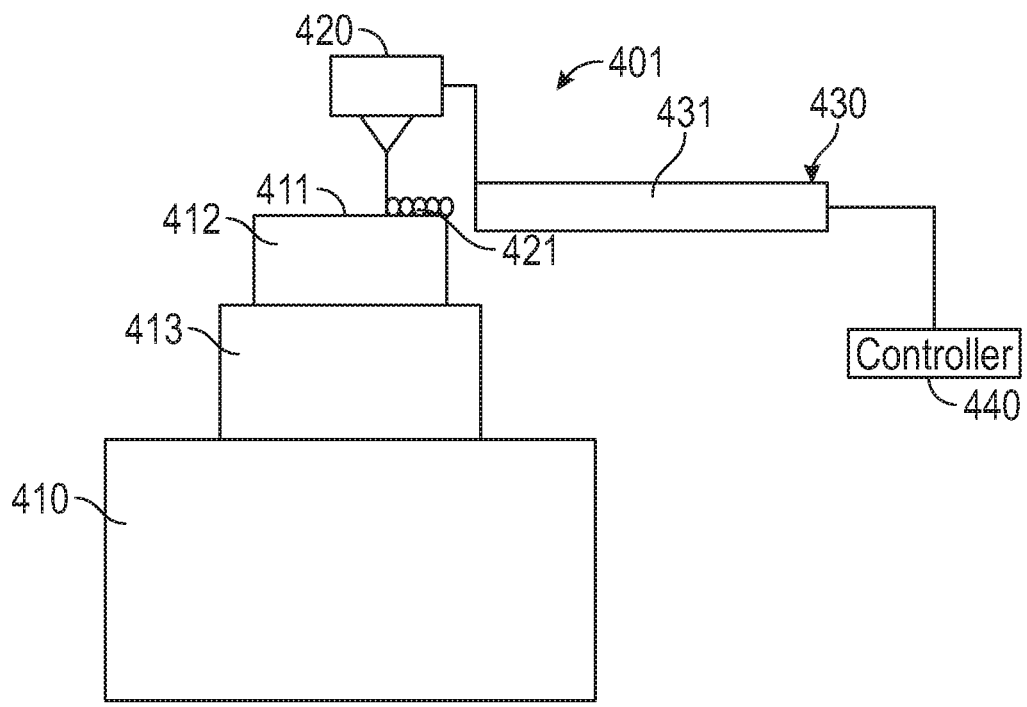
FIG. 4 is a schematic diagram of a blade repair apparatus in accordance with embodiments.

With reference to FIG. 4, a blade repair apparatus 401 is provided and includes a jig 410 on which base materials 411, such as base materials forming a rotor blade tip (or chord) 412 of a rotor blade (e.g., the rotor blade 68 and other gas turbine engine blades), are locked in a predefined position by a vise 413, a deposition head 420, a temperature control system 430 and a controller 440. The deposition head 420 is movable relative to the base materials 411 and is configured to execute a repair operation. This repair operation includes, among other processes, a deposition of additional materials 421 onto the base materials 411 during movements of the deposition head 420. The temperature control system 430 includes a temperature regulating assembly 431, which is coupled with the deposition head 420 such that the temperature regulating assembly 431 is disposed in a trailing position relative to the deposition head 420. The controller 440 is operably coupled to the deposition head 420 and the temperature control system 430.

Figure 5:
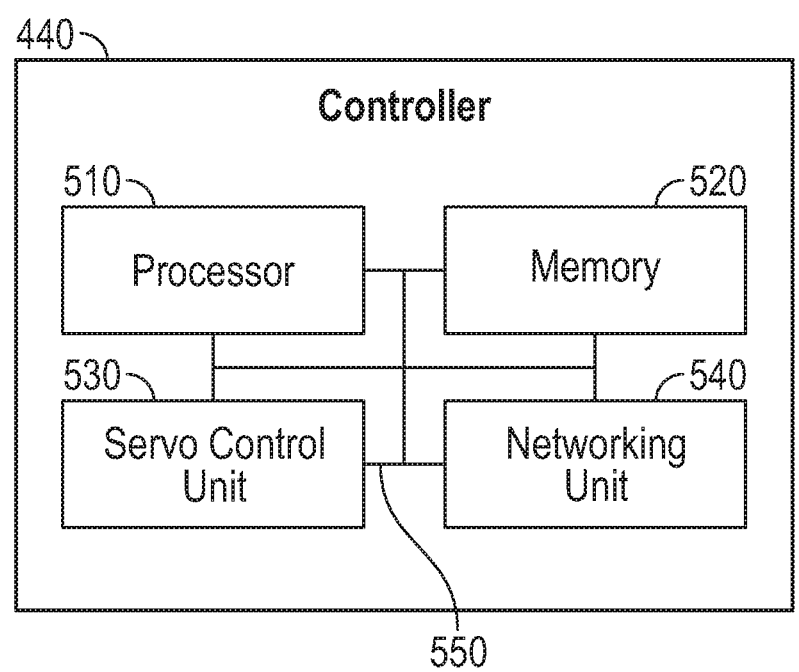
FIG. 5 is a schematic diagram illustrating components of a controller of the blade repair apparatus of FIG. 4.

With reference to FIG. 5, the controller 440 includes a processor 510, a memory 520, a servo control unit 530, a networking unit 540 and an input/output (I/O) bus 550 by which the processor 510, the memory 520, the servo control unit 530 and the networking unit 540 are communicative. The servo control unit 530 directly controls various operations of the deposition head 420 and the temperature control system 430 in accordance with commands received from the processor 510. The networking unit 540 permits communication between the processor 510 and external computing and sensing devices. The memory 520 has executable instructions stored thereon which are readable and executable by the processor 510. When the executable instructions are read and executed by the processor 510, the executable instructions cause the processor 510 to operate as described herein. In particular, when the executable instructions are read and executed by the processor 510, the executable instructions cause the processor 510 to control the movements of the deposition head 420 as well as the depositional operations of the deposition head 420 and to control the temperature control system 430 such that the temperature regulating assembly 431 controls temperatures of at least the base materials 411 and the additional materials 421 during at least the movements of the deposition head 420 the depositional operations.

Figure 6:
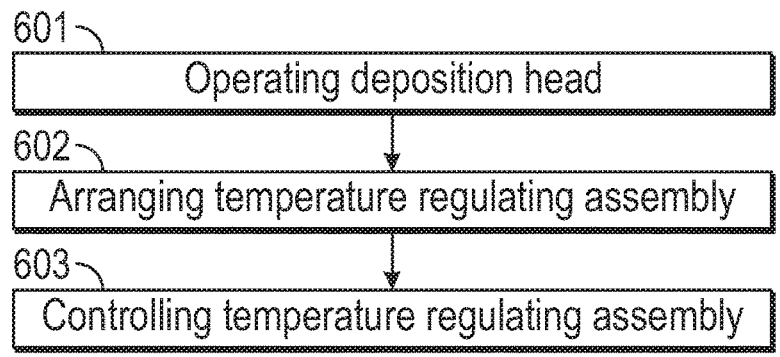
FIG. 6 is a flow diagram illustrating a method of operating a blade repair apparatus in accordance with embodiments.

With reference to FIG. 6, the blade repair apparatus 401 described above is configured to execute a blade repair method. As shown in FIG. 6, the blade repair method includes operating the deposition head 420 to deposit the additional materials 421 onto the base materials 4111 while moving the deposition head 420 relative to the base materials 411 (601), arranging the temperature regulating assembly 431 to remain aside the base materials 411 in a trailing position relative to the deposition head 420 (602) and controlling operations of the temperature regulating assembly 431 during and after movements of the deposition head 420 and during and after depositional operations of the deposition head 420 (603). The operating of operation 603 is executed in order to control temperatures of at least the base materials 411 and the additional materials 421 during at least the movements of the deposition head 420 and the depositional operations.

In accordance with alternative embodiments, the controller 440 can be configured to control the movements of the deposition head 420 and to control depositional operations of the deposition head 420 to execute a weld operation along the rotor blade tip 412. In such cases, the controller 420 controls the temperature control system 430 such that the temperature regulating assembly 431 preheats the base materials 411 and maintains temperatures of the base materials 411 and the additional materials 421 during at least the movements of the deposition head (and possibly some time after deposition is complete for stress relief) 420 and the depositional operations. Here, the deposition head 420 can include a laser emitter and a powder dispenser and the temperature regulating assembly 431 can include induction coils that configured to generate heat that can thereby heat at least the base materials 411 and the additional materials 421.

In accordance with alternative embodiments, the controller 440 can be configured to control the movements of the deposition head 420 and to control depositional operations of the deposition head 420 to execute a laser cladding process along the rotor blade tip 412. In such cases, the controller 420 controls the temperature control system 430 such that the temperature regulating assembly 431 cools at least the base materials 411 and the additional materials 421 during at least the movements of the deposition head 420 and the depositional operations. Here, the deposition head 420 can include a laser emitter and a powder dispenser and the temperature regulating assembly 431 can include impingement diffusers that are configured to direct impingement gas toward at least the base materials 411 and the additional materials 421 to thereby cool the base materials 411 and the additional materials 421 as the additional materials 421 are dispensed or laid down.

Figure 7:
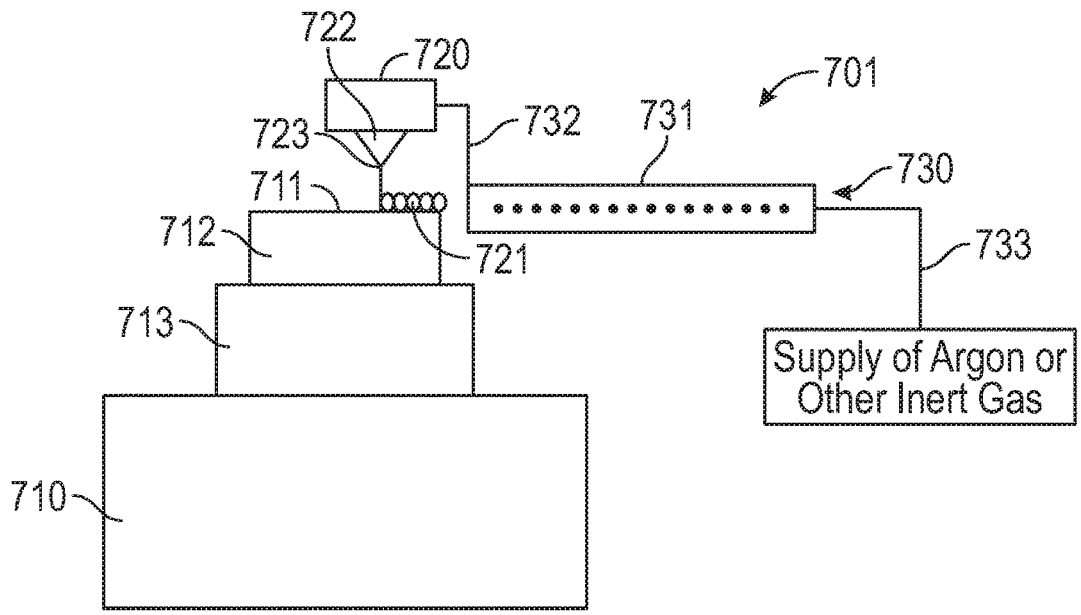
FIG. 7 is a schematic diagram of a gas impingement in-process cooling system in accordance with embodiments.

In accordance with embodiments and with reference to FIG. 7, a gas impingement in-process cooling system 701 is provided and includes a jig 710 on which base materials 711, such as base materials forming a rotor blade tip (or chord) 712 of a rotor blade (e.g., the rotor blade 68 and other gas turbine engine blades), are locked in a predefined position by a vise 713, a deposition head 720 and a gas impingement assembly 730. The deposition head 720 is movable relative to the base materials 711 and is configured to execute a repair operation. This repair operation includes, among other processes, a deposition of additional materials 721 onto the base materials 711 during movements of the deposition head 720 as part of a laser cladding process. To this end, the deposition head 720 can include a powder dispenser 722 and a laser emitter 723. The gas impingement assembly 730 includes impingement diffusers 731, a support structure 732 to support the impingement diffusers 731 at opposite sides of the base materials 711 in a trailing position relative to the deposition head 420 and a supply system 733 that supplies the impingement diffusers 731 with impingement gas.

The gas impingement in-process cooling system 701 can further include a controller. This controller could be provided as a pressure controller and valve in some cases and can be similar in configuration and operation to the controller 440 described above in other cases. For the latter cases, the controller has been described in detail above and therefore does not need to be described further.

Figure 8:
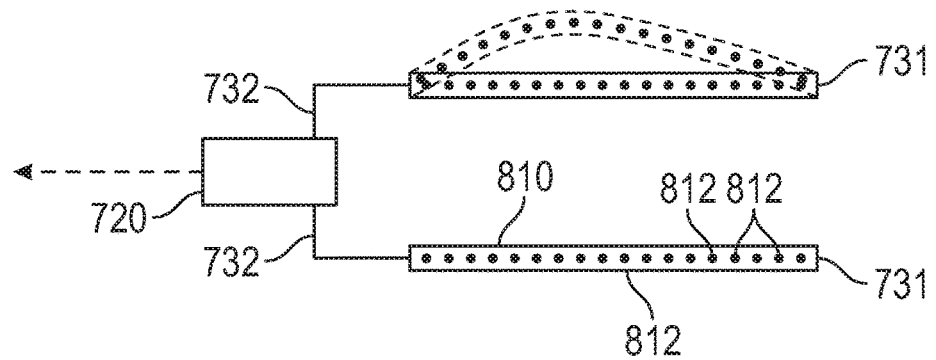
FIG. 8 is a top-down view of components of the gas impingement in-process cooling system of FIG. 7.
Figure 9:
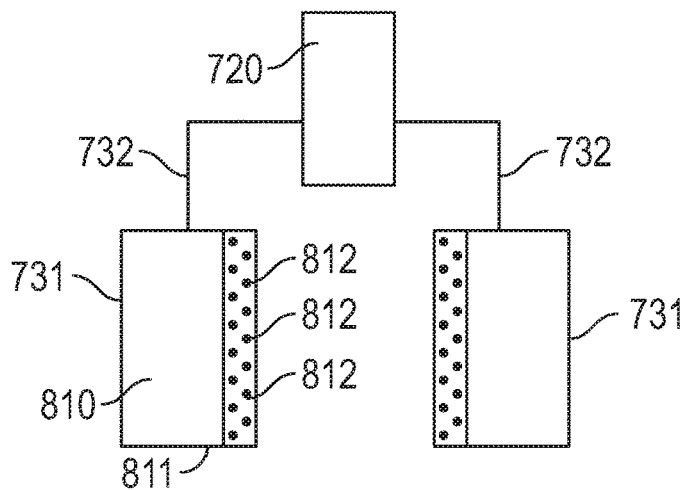
FIG. 9 is a rear view of components of the gas impingement in-process cooling system of FIG. 7.

With reference to FIGS. 8 and 9, the impingement diffusers 731 can be provided as a first impingement diffuser 731 that faces a first or pressure side of the rotor blade tip 712 and a second impingement diffuser 731 that faces a second or suction side of the rotor blade tip 712. Each impingement diffuser 731 can be provided as an elongate tubular element 810 with an outer shell 811 that is formed to define perforations 812. The elongate tubular element 810 can be substantially straight (in some embodiments, the elongate tubular element 810 can be curved for example in a manner that matches a curvature of a blade or workpiece). The impingement gas that is supplied to the impingement diffusers 731 charges into the interior of the elongate tubular element 810 and is output through the perforations 812 in multiple directions toward the base materials 711 and the additional materials 721.

During operations of the gas impingement in-process cooling system 701, the deposition head 720 first travels along a longitudinal axis of the rotor blade tip 712 and the powder dispenser 722 dispenses the additional materials 721 as powder onto the base materials 711 while the laser emitter 723 emits a laser beam to heat and liquefy the additional materials 721. The first and second impingement diffusers 731 travel with the deposition head 720 in trailing positions and are supplied with impingement gas by the supply system 733 while the additional materials 721 are laid down and/or liquefied. This impingement gas is directed onto the base materials 711 and the additional materials 721 in multiple directions at the first and second sides of the rotor blade tip 712 by the first and second impingement diffusers 731. The multi-directional or linear flow of the impingement gas toward the base materials 711 and the additional materials 721 serves to cool the base materials 711 and the additional materials 721 at a relatively high cooling rate and thus prevents the formation of relatively large grains therein.

Once the deposition head 720 and the impingement diffusers 731 completely travel along the longitudinal axis of the rotor blade tip 712, the deposition head 720 and the impingement diffusers 731 return to their initial positions at a slightly higher elevation. From here, the above-described operations are repeated whereby a column of layers of additional materials 721 is eventually built up.

Figure 10:
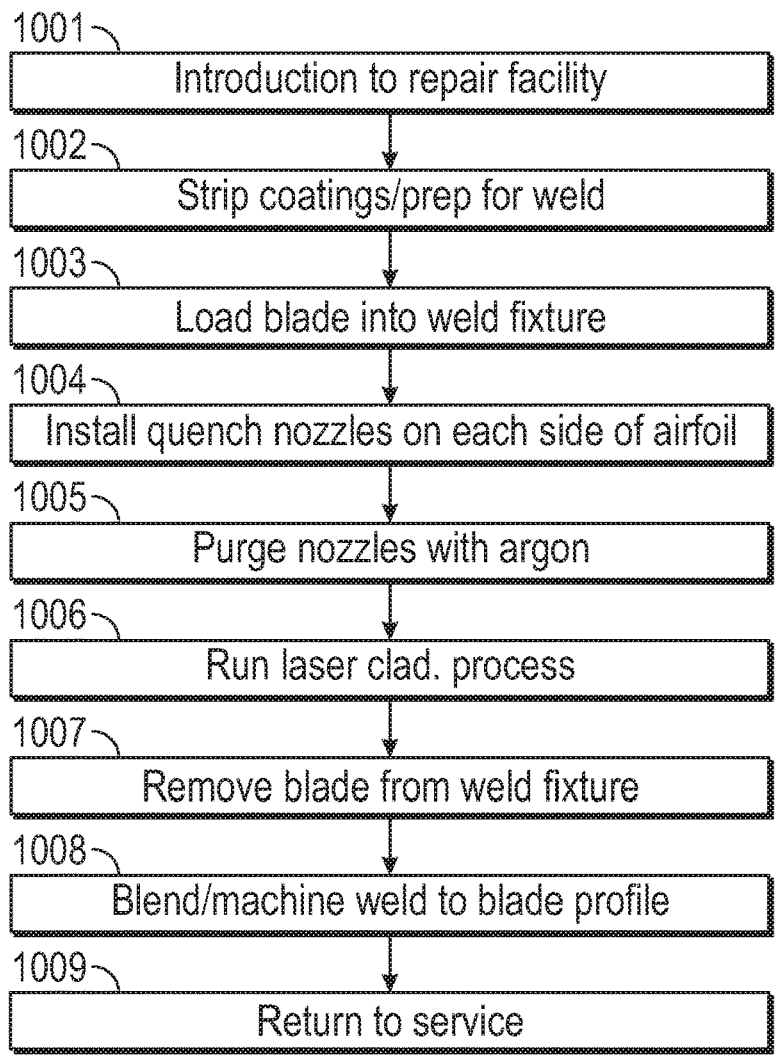
FIG. 10 is a flow diagram illustrating a method of operating the gas impingement in-process cooling system of FIGS. 7-9.

As shown in FIG. 10, a method of operation of gas impingement in-process cooling system 701 includes an introduction to a repair facility (1001) and an initial process whereby coatings of the rotor blade are stripped and portions of the rotor blade are prepped (1002). At this point, the rotor blade is loaded onto the fixture or jig 710 (1003), the first and second impingement diffusers 731 are installed to face the first and second sides of the rotor blade tip 712 (1004) and the first and second impingement diffusers 731 are purged with an inert gas (1005). The deposition head 720, the supply system 733 and a controller of the gas impingement in-process cooling system 701 then execute a weld process, such as a laser cladding process (1006). Subsequently, the rotor blade can be removed from the fixture or jig 710 (1007), machined to a blade profile (1008) and returned to service (1009).

Figure 11:
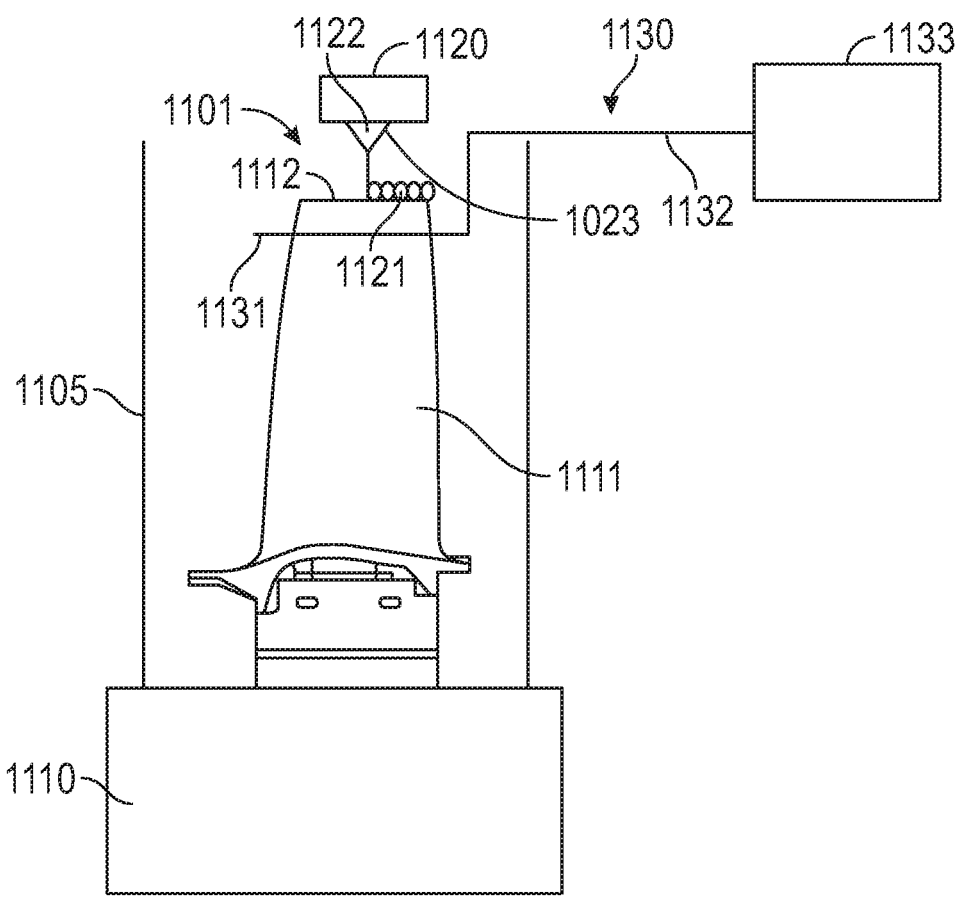
FIG. 11 is a schematic diagram of a weld repair system in accordance with embodiments.

In accordance with embodiments and with reference to FIG. 11, a weld repair system 1101 is provided and includes an atmospheric enclosure 1105, a fixture or jig 1110 on which a rotor blade 1111 having base materials 1112 at its tip is supported within the atmospheric enclosure 1105, a deposition head 1120 and a heating assembly 1130. The deposition head 1120 is movable relative to the base materials 1112 and is configured to execute a repair operation. This repair operation includes, among other processes, a deposition of additional materials 1121 onto the base materials 1112 during movements of the deposition head 1120 as part of a weld process. To this end, the deposition head 1120 can include a powder dispenser 1122 and a laser emitter 1123. The heating assembly 1130 includes heating elements 1131, such as induction coils, a support structure 1132 to support the heating elements 1131 aside the base materials 1112 in a trailing position relative to the deposition head 1120 and a control system 1133 that controls activations of the heating elements 1131.

The weld repair system 1101 can further include a controller. This controller is similar in configuration and operation to the controller 440 described above and therefore does not need to be described further.

An overall operation of the weld repair system 1101 is similar to the operation described above with reference to FIGS. 8 and 9 and need not be described again. The primary difference in the operation of the weld repair system 1101 is that the heating elements 1131 pre-heat the base materials 1112 prior to the deposition of the additional materials 1121 and then maintain elevated temperatures of the base materials 1112 and the additional materials 1121 while the additional materials 1121 are laid down or deposited and/or liquefied. Additional differences lie in the execution of the weld repair within the atmospheric enclosure 1105 and will be described in greater detail below with reference to FIG. 12.

Figure 12:
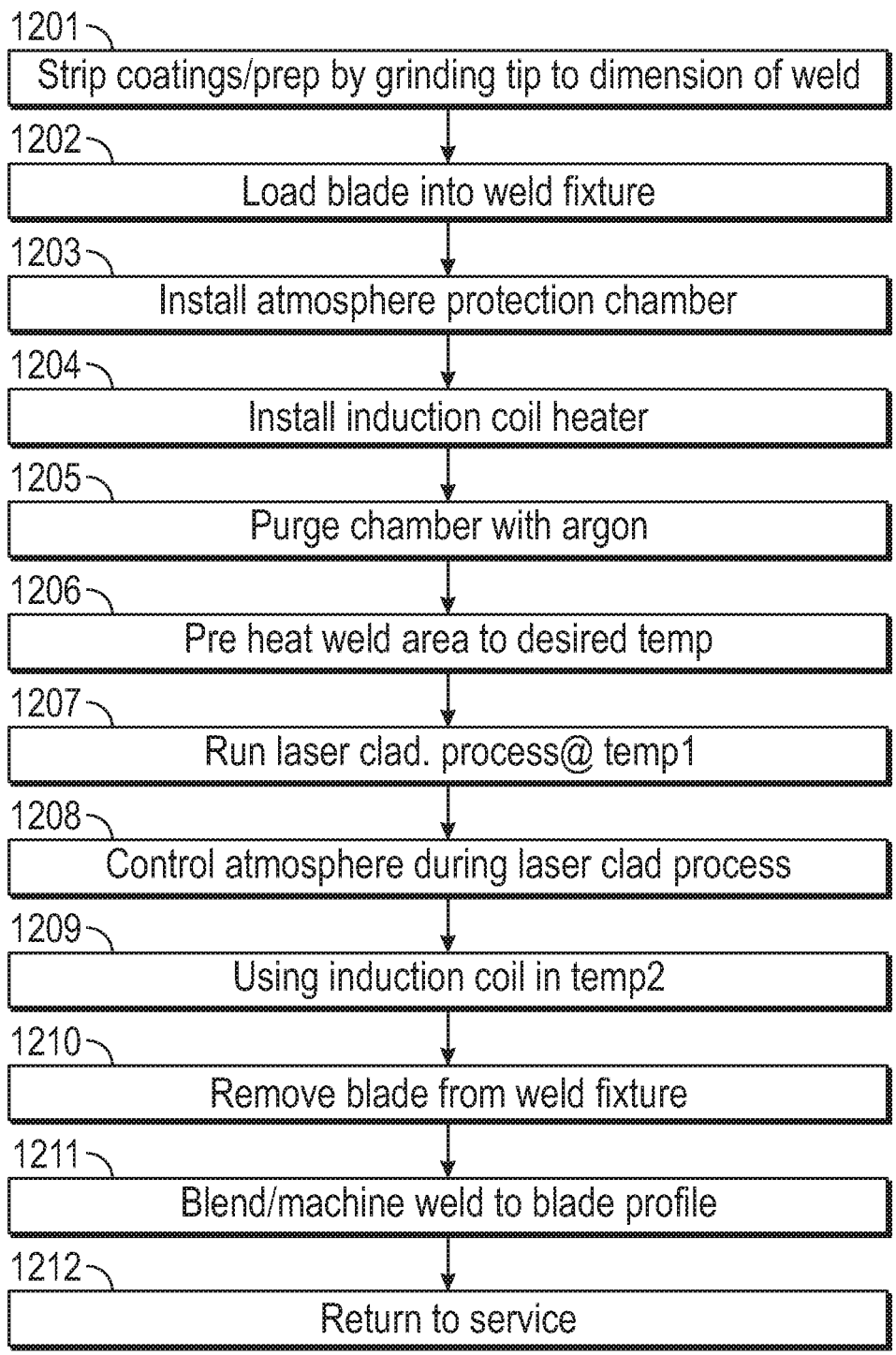
FIG. 12 is a flow diagram illustrating a method of operating the weld repair system of FIG. 11.

As shown in FIG. 12, a method of operation of the weld repair system 1101 includes an initial process whereby coatings of the rotor blade 1111 are stripped and portions of the tip of the rotor blade 1111 are grinded to obtain dimensions that are appropriate for welding (1201). At this point, the rotor blade 1111 is loaded into the fixture or jig 1110 (1202), the atmospheric enclosure 1105 is installed (1203), the heating elements 1131 are installed (1204) and the atmospheric enclosure 1105 is purged with an inert gas (1205). The control system 1133 then activates the heating elements 1131 to pre-heat the base materials 1112 in the weld area (1206) and a weld process, such as a laser cladding process, is executed at a first temperature (1207) while atmospheric conditions within the atmospheric enclosure 1105 are controlled (1208). Subsequently, the control system 1133 re-activates the heating elements 1131 to maintain or increase temperatures of the base materials 1112 and the additional materials 1121 in the weld area (1209). Finally, the rotor blade 1111 can be removed from the fixture or jig 1110 (1210), the weld can be machined to a blade profile (1211) and the rotor blade 1111 can be returned to service (1212).

Figure 13:
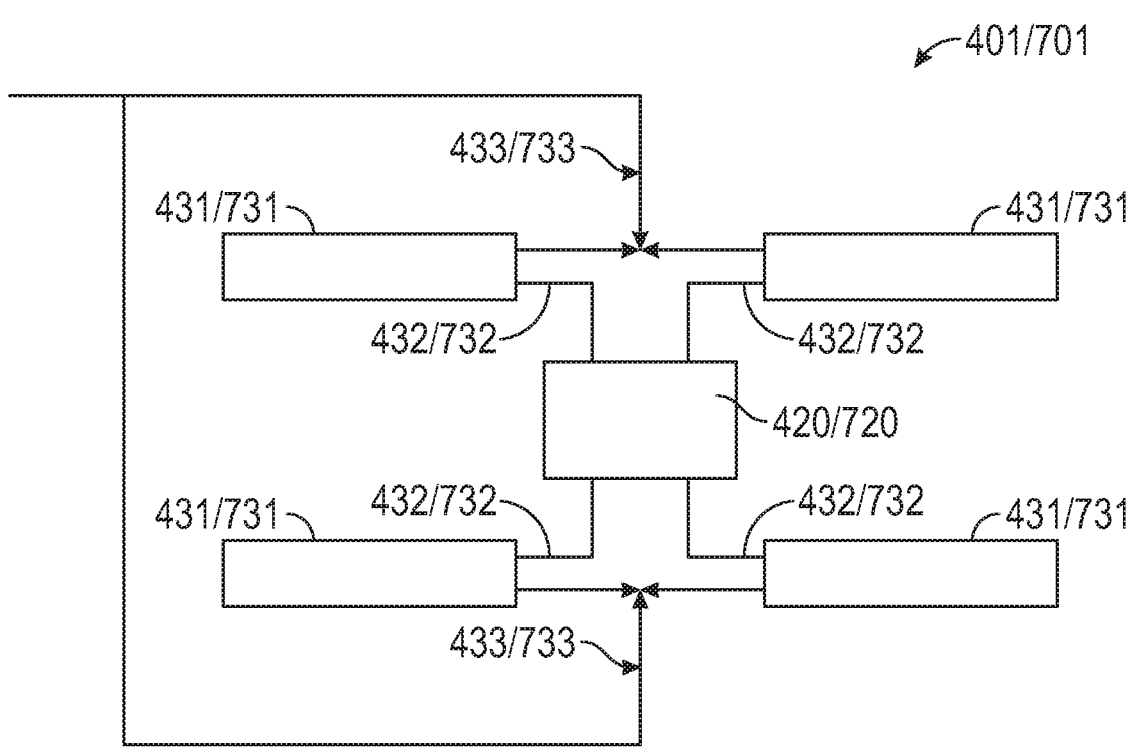
FIG. 13 is a top-down view of components of a blade repair apparatus in accordance with embodiments.

In accordance with further embodiments of the invention and with reference to FIG. 13, the blade repair apparatus 401 of FIG. 4 (as well as the gas impingement in-process cooling system 701 of FIG. 7 and the weld repair system 1101 of FIG. 11) can be reconfigured whereby the temperature regulating assembly 431 is coupled with the deposition head 420 such that the temperature regulating assembly 431 is disposed in leading and trailing positions relative to the deposition head 420 when the deposition head 420 travels in a first direction and in opposite positions when the deposition head 420 travels in a second direction.

For the case of the gas impingement in-process cooling system 701, as an example, this would mean that the impingement diffusers 731 would be positioned ahead of and behind the deposition head 720 on both sides of the rotor blade tip 412 and the supply system 733 could include valves to control operations of the leading/trailing impingement diffusers 731. That is, when the deposition head 420 travels in a first direction, the trailing impingement diffusers 731 would be supplied with impingement gas and the leading impingement diffusers 731 would be effectively deactivated whereas, when the deposition head 420 travels in a second direction, the leading (formally trailing) impingement diffusers 731 would be supplied with impingement gas and the trailing (formally leading) impingement diffusers 731 would be effectively deactivated (they could be left activated to further the temperature reduction, especially during ops where more layers are deposited).

Benefits of the features described herein are the provision of high-pressure gas impingement quenching that allows for substantially greater cooling capability than conventional cooling methods. Cooling flows are applied to deposited materials as they are being deposited during, e.g., laser cladding processes. This approach allows for optimized cooling and minimized grain growth to achieve a refined microstructure, leading to extended life.

Benefits of the features described herein are also the provision of weld repairs with relatively high strength that will withstand high temperatures better than current weld fillers. This could lead to longer time-on-wing capabilities in most instances.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A blade repair apparatus, comprising:
    a deposition head which is movable relative to base materials and configured to execute a repair operation comprising a deposition of additional materials onto the base materials during deposition head movements;
    a temperature control system comprising a temperature regulating assembly coupled with the deposition head in a trailing position; and
    a controller operably coupled to the deposition head and the temperature control system, wherein:
    the controller is configured to control the deposition head movements and depositional operations of the deposition head,
    the controller is configured to control the temperature control system such that the temperature regulating assembly controls temperatures of at least the base materials and the additional materials during at least the deposition head movements and the depositional operations, and
    the temperature control system comprises:
    impingement diffusers, each comprising a perforated tubular body;
    a support structure to support the impingement diffusers at opposite sides of the base materials in a trailing position relative to the deposition head; and
    a supply system configured to supply the perforated tubular body of each impingement diffuser with impingement gas.

2. The blade repair apparatus according to claim 1, wherein the base materials form a rotor blade tip.

3. The blade repair apparatus according to claim 2, wherein:
    the controller controls the deposition head movements and depositional operations of the deposition head to execute a laser cladding process, and
    the controller controls the temperature control system such that the temperature regulating assembly cools at least the base materials and the additional materials during at least the deposition head movements and the depositional operations.

4. The blade repair apparatus according to claim 3, wherein the deposition head comprises a laser emitter and a powder dispenser.

5. A gas impingement in-process cooling system, comprising:
    a deposition head which is movable relative to base materials and configured to execute a repair operation comprising a deposition of additional materials onto the base materials during deposition head movements; and
    a gas impingement assembly comprising impingement diffusers, a support structure to support the impingement diffusers at opposite sides of the base materials in a trailing position relative to the deposition head and a supply system configured to supply the impingement diffusers with impingement gas
    wherein each impingement diffuser comprises a perforated tubular body communicative with the supply system.

6. The gas impingement in-process cooling system according to claim 5, wherein the base materials comprise a rotor blade tip.

7. The gas impingement in-process cooling system according to claim 6, wherein the deposition head is movable along a longitudinal axis of the rotor blade tip.

8. The gas impingement in-process cooling system according to claim 6, wherein the deposition head deposits the additional materials in a laser cladding process.

9. The gas impingement in-process cooling system according to claim 6, wherein the deposition head deposits the additional materials in a column of layers on the rotor blade tip.

10. The gas impingement in-process cooling system according to claim 5, wherein each impingement diffuser is configured such that impingement gas supplied thereto is directed toward the base materials and the additional materials in multiple directions.

11. The gas impingement in-process cooling system according to claim 5, wherein the gas impingement assembly comprises:
    first impingement diffusers; and
    second impingement diffusers,
    wherein:
    the support structure supports the first and second impingement diffusers at opposite sides of the base materials in first and second trailing positions relative to the deposition head, respectively, and
    the supply system supplies the first and second impingement diffusers with the impingement gas.

12. The gas impingement in-process cooling system according to claim 5, further comprising a controller operably coupled to the deposition head and the supply system, wherein:
    the controller is configured to control the deposition head movements and depositional operations of the deposition head, and
    the controller is configured to control the gas impingement assembly such that the supply system supplies the impingement diffusers with the impingement gas during at least the deposition head movements and the depositional operations.

* * * * *